US012521307B2

(12) United States Patent
Zeng et al.

(10) Patent No.: US 12,521,307 B2

(45) Date of Patent: Jan. 13, 2026

(54) INFLATABLE MASSAGE POOL WITH BUILT-IN INFLATABLE SEAT

(71) Applicant: BESTWAY INFLATABLES & MATERIAL CORP., Shanghai (CN)

(72) Inventors: Xianglin Zeng, Shanghai (CN); Yunzhe Ban, Shanghai (CN); Qingshui Song, Shanghai (CN); Chenggen Liu, Shanghai (CN)

(73) Assignee: BESTWAY INFLATABLES & MATERIAL CORP., Shanghai (CN)

(*) Notice: Subject to any disclaimer, the term of this patent is extended or adjusted under 35 U.S.C. 154(b) by 163 days.

(21) Appl. No.: 18/389,431

(22) Filed: Nov. 14, 2023

(65) Prior Publication Data

US 2024/0423871 A1 Dec. 26, 2024

(30) Foreign Application Priority Data

Jun. 21, 2023 (CN) ......................... 202321604033.8

(51) Int. Cl.

*A61H 33/00* (2006.01)
*A61H 33/02* (2006.01)
*E04H 4/00* (2006.01)

(52) U.S. Cl.

CPC ....... *A61H 33/6026* (2013.01); *A61H 33/028* (2013.01); *A61H 33/6005* (2013.01); *E04H 4/0025* (2013.01); *A61H 2201/0103* (2013.01)

(58) Field of Classification Search

CPC .............. A61H 33/6062; A61H 33/028; A61H 33/6005; A61H 33/6089; A61H 33/6047;

(Continued)

(56) References Cited

U.S. PATENT DOCUMENTS

| | | | | |
|---|---|---|---|---|
| 4,339,833 A | | 7/1982 | Mandell | |
| 11,639,608 B2 | * | 5/2023 | Fillot | E04H 4/144 4/493 |
| 2017/0058544 A1 | * | 3/2017 | Lin | B05B 7/00 |

FOREIGN PATENT DOCUMENTS

| | | |
|---|---|---|
| CN | 217724070 U | 11/2022 |
| CN | 218541710 U | 2/2023 |
| WO | 2022193711 A1 | 9/2022 |

OTHER PUBLICATIONS

Notice of First Examination Opinion dated Jan. 8, 2024 (Jan. 8, 2024), 6 pages (English translation 4 pages, Office Action 2 pages) issued on related Chinese Patent Application 202321604033.8 issued by the China National Intellectual Property Administration.

(Continued)

*Primary Examiner* — David J Walczak

(74) *Attorney, Agent, or Firm* — Dickinson Wright PLLC

(57) ABSTRACT

As inflatable massage pool is provided and includes a pool body including an inflatable side wall, defining therein a first air chamber, and a bottom wall. The inflatable side wall and the bottom wall jointly define a water containing cavity. An inflatable seat is disposed in the water containing cavity and defines therein a second air chamber. A fluid delivery assembly includes a fluid supply pipeline disposed at least partially within one of the water containing cavity and the second air chamber and a plurality of massage spray heads mounted to the inflatable seat and configured to spray fluid into the water containing cavity. The fluid supply pipeline is in fluid communication with the plurality of massage spray heads.

20 Claims, 11 Drawing Sheets

(58) Field of Classification Search
CPC ............ A61H 33/6052; A61H 33/6063; E04H 4/0025; E04H 4/0018; E04H 4/0093; E04H 4/12; E04H 4/1245
USPC ..... 4/541.4, 546, 547, 559, 560.1, 568, 569, 4/589, 590
See application file for complete search history.

(56) References Cited

OTHER PUBLICATIONS

Extended European Search Report dated Apr. 25, 2024 (Apr. 25, 2024), 7 pages, issued on related European Patent Application EP23212537.7 by the European Patent Office.

* cited by examiner

INFLATABLE MASSAGE POOL WITH BUILT-IN INFLATABLE SEAT

CROSS-REFERENCE TO RELATED APPLICATION

This application claims priority from Chinese Application CN202321604033.8, filed Jun. 21, 2023 in China, the disclosure of which is incorporated herein by reference in its entirety.

BACKGROUND

1. Field

Example embodiments relate to inflatable pools, and more particularly to an inflatable massage pool with a built-in inflatable seat.

2. Description of Related Art

An inflatable massage pool can contain warm or hot water for allowing a user to immerse their body in the water for relaxing. Existing inflatable massage pools may have a pool main body defining a water containing space. A fluid pipeline is arranged in an internal air chamber of the pool main body to supply a massage water flow or a massage air flow, and massage spray heads are included on an internal wall of the pool main body and provide massage to the user by spraying water or air flows. Since the massage spray heads are arranged on the internal wall of the pool main body, the location and quantity of the massage spray heads are limited, so that it may be difficult to perform multi-directional massage or a whole body massage. A user would need to adjust their position and posture in the water such that their body could be massaged by leaning against the massage spray heads on the internal wall of the pool main body. Generally, a user needs to sit when using a massage function, and their body posture needs to be relatively fixed, resulting in only the back or waist of a user being massaged, and thus, a user may find it difficult to be fully relaxed.

SUMMARY

Example embodiments may address at least the above problems and/or disadvantages and other disadvantages not described above. Also, example embodiments are not required to overcome the disadvantages described above, and may not overcome any of the problems described above.

According to an aspect of an example embodiment, an inflatable massage pool comprises: a pool body, comprising: an inflatable side wall defining therein a first air chamber, and a bottom wall, wherein the inflatable side wall and the bottom wall jointly define a water containing cavity; an inflatable seat disposed in the water containing cavity, the inflatable seat defining therein a second air chamber; and a fluid delivery assembly, comprising: a fluid supply pipeline disposed at least partially within one of the water containing cavity and the second air chamber, and a plurality of massage spray heads mounted to the inflatable seat and configured to spray fluid into the water containing cavity, wherein the fluid supply pipeline is in fluid communication with the plurality of massage spray heads.

The fluid supply pipeline may comprise a water supply pipeline disposed at least partially within the one of the water containing cavity and the second air chamber and in fluid communication with the plurality of massage spray heads; and the fluid delivery assembly may further comprise: a water outlet pipeline in fluid communication with the water containing cavity, and a pumping unit connected to the water outlet pipeline and to the water supply pipeline thereby providing fluid communication between the water outlet pipeline and the water supply pipeline.

The fluid supply pipeline may further comprise an air supply pipeline disposed at least partially within the one of the water containing cavity and the second air chamber; wherein the air supply pipeline is in fluid communication with the plurality of massage spray heads.

An air intake end of the air supply pipeline may be in fluid communication with a space external to the inflatable massage pool.

The massage spray head may comprise: a water intake portion connected to and in fluid communication with the water supply pipeline, and an air intake portion connected to and in fluid communication with the air supply pipeline; wherein each of the water intake portion and the air intake portion is disposed within the one of the water containing cavity and the second air chamber.

The plurality of massage spray heads may each be at least partially disposed within the second air chamber; the water supply pipeline may extend at least partially into the second air chamber from the inflatable side wall; and the water supply pipeline may be connected to and in fluid communication with each of the plurality of massage spray heads.

The water supply pipeline may comprise: a primary water supply pipe disposed at least partially within the inflatable side wall and connected to and in fluid communication with the pumping unit, and a secondary water supply pipe disposed at least partially within the second air chamber and in fluid communication with the primary water supply pipe.

The water supply pipeline may further comprise an intermediate water supply pipeline, and wherein the secondary water supply pipe is connected to and in fluid communication with the primary water supply pipe via the intermediate water supply pipeline.

The water supply pipeline may comprise: a plurality of secondary water supply pipes disposed within the second air chamber and arranged substantially parallel to each other, wherein each of the plurality of secondary water supply pipes is connected to and in fluid communication with at least two massage spray heads, arranged in a length direction of the secondary water supply pipe, from among the plurality of massage spray heads.

The fluid supply pipeline may further comprise: an air supply pipeline extending at least partially into the second air chamber from the inflatable side wall and connected to and in fluid communication with the plurality of massage spray heads.

The air supply pipeline may comprise: a primary air supply pipe disposed at least partially within the first air chamber and in fluid communication with a space external to the inflatable massage pool; and a secondary air supply pipe disposed at least partially within the second air chamber and in fluid communication with the primary air supply pipe.

The air supply pipeline may further comprise an intermediate air supply pipeline; wherein the secondary air supply pipe is connected to and in fluid communication with the primary air supply pipe via the intermediate air supply pipeline.

Each of the plurality of massage spray heads may be disposed at least partially within the inflatable seat; and the water supply pipeline may extend at least partially into the water containing cavity from the inflatable side wall and be connected to and in fluid communication with each of the plurality of massage spray heads.

The inflatable seat may further comprise: a plurality of massage spray head receiving portions, each defining therein a receiving space which is not in fluid communication with the second air chamber and which is sized to receive a corresponding one of the plurality of massage spray heads therein.

The water supply pipeline may comprise: a primary water supply pipe disposed at least partially within the inflatable side wall and connected to and in fluid communication with the pumping unit; and a secondary water supply pipe disposed at least partially within the water containing cavity and in fluid communication with the primary water supply pipe.

The inflatable seat may comprise a plurality of inflatable seats; the water supply pipeline comprises a plurality of secondary water supply pipes corresponding in number to a number of the plurality of inflatable seats; the plurality of massage spray heads comprising a plurality of massage spray head groups corresponding in number to the number of the plurality of inflatable seats; each of the plurality of massage spray head groups may be connected to and in fluid communication with a corresponding one of the plurality of secondary water supply pipes; and each of the plurality of massage spray head groups may be mounted to a corresponding one of the plurality of inflatable seats.

The water supply pipeline may further comprise an intermediate water supply pipeline, wherein the secondary water supply pipe is connected to and in fluid communication with the primary water supply pipe via the intermediate water supply pipeline.

The fluid supply pipeline may further comprise an air supply pipeline extending at least partially into the water containing cavity from the inflatable side wall and connected to and in fluid communication with the plurality of massage spray heads.

The air supply pipeline may comprise: a primary air supply pipe disposed at least partially within the first air chamber and in fluid communication with a space external to the inflatable massage pool; and a secondary air supply pipe disposed at least partially within the water containing cavity and in fluid communication with the primary air supply pipe.

The air supply pipeline may further comprise a tube connector fixed to an internal wall of the inflatable side wall, wherein the secondary air supply pipe is connected to and in fluid communication with the primary air supply pipe via the tube connector.

The inflatable seat may comprise: a top sheet, a bottom sheet, and a side enclosure sheet, connected to one another and thereby jointly defining the second air chamber, wherein the plurality of massage spray heads are fixed to the top sheet.

BRIEF DESCRIPTION OF THE DRAWINGS

The above and/or other aspects will become apparent and more readily appreciated from the following description of example embodiments, taken in conjunction with the accompanying drawings, in which.

DETAILED DESCRIPTION

Figure 1:
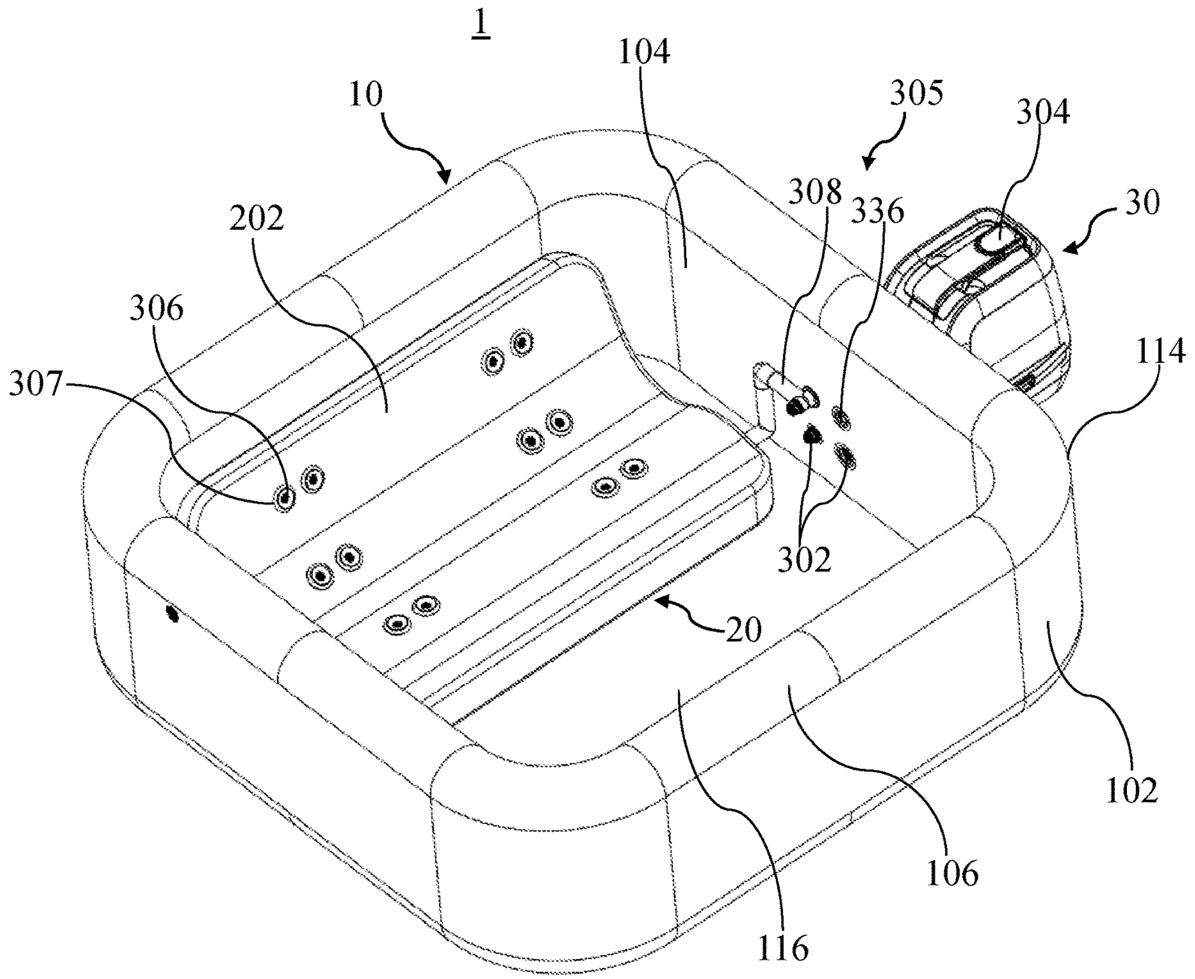
FIG. 1 is a perspective view of an inflatable massage pool with a built-in inflatable seat according to a first example embodiment.

Reference will now be made in detail to example embodiments which are illustrated in the accompanying drawings, wherein like reference numerals refer to like elements throughout. In this regard, the example embodiments may have different forms and may not be construed as being limited to the descriptions set forth herein.

It will be understood that the terms "include," "including", "comprise, and/or "comprising," when used in this specification, specify the presence of stated features, integers, steps, operations, elements, and/or components, but do not preclude the presence or addition of one or more other features, integers, steps, operations, elements, components, and/or groups thereof.

It will be further understood that, although the terms "first," "second," "third," etc., may be used herein to describe various elements, components, regions, layers and/or sections, these elements, components, regions, layers and/or sections may not be limited by these terms. These terms are only used to distinguish one element, component, region, layer or section from another element, component, region, layer or section.

As used herein, the term "and/or" includes any and all combinations of one or more of the associated listed items. Expressions such as "at least one of," when preceding a list of elements, modify the entire list of elements and do not modify the individual elements of the list.

Various terms are used to refer to particular system components. Different companies may refer to a component by different names—this document does not intend to distinguish between components that differ in name but not function.

Matters of these example embodiments that are obvious to those of ordinary skill in the technical field to which these example embodiments pertain may not be described here in detail.

It should be understood that in the description herein, expressions of the positions of various components, such as "upper," "lower," "top," and "bottom," are not absolute but relative. The orientation expressions are appropriate when the various components are arranged as shown in the figures, but should change accordingly when the positions of the various components in the figures change.

FIGS. 1 to 5 show an inflatable massage pool with a built-in inflatable seat according to a first example embodiment.

Figure 2:
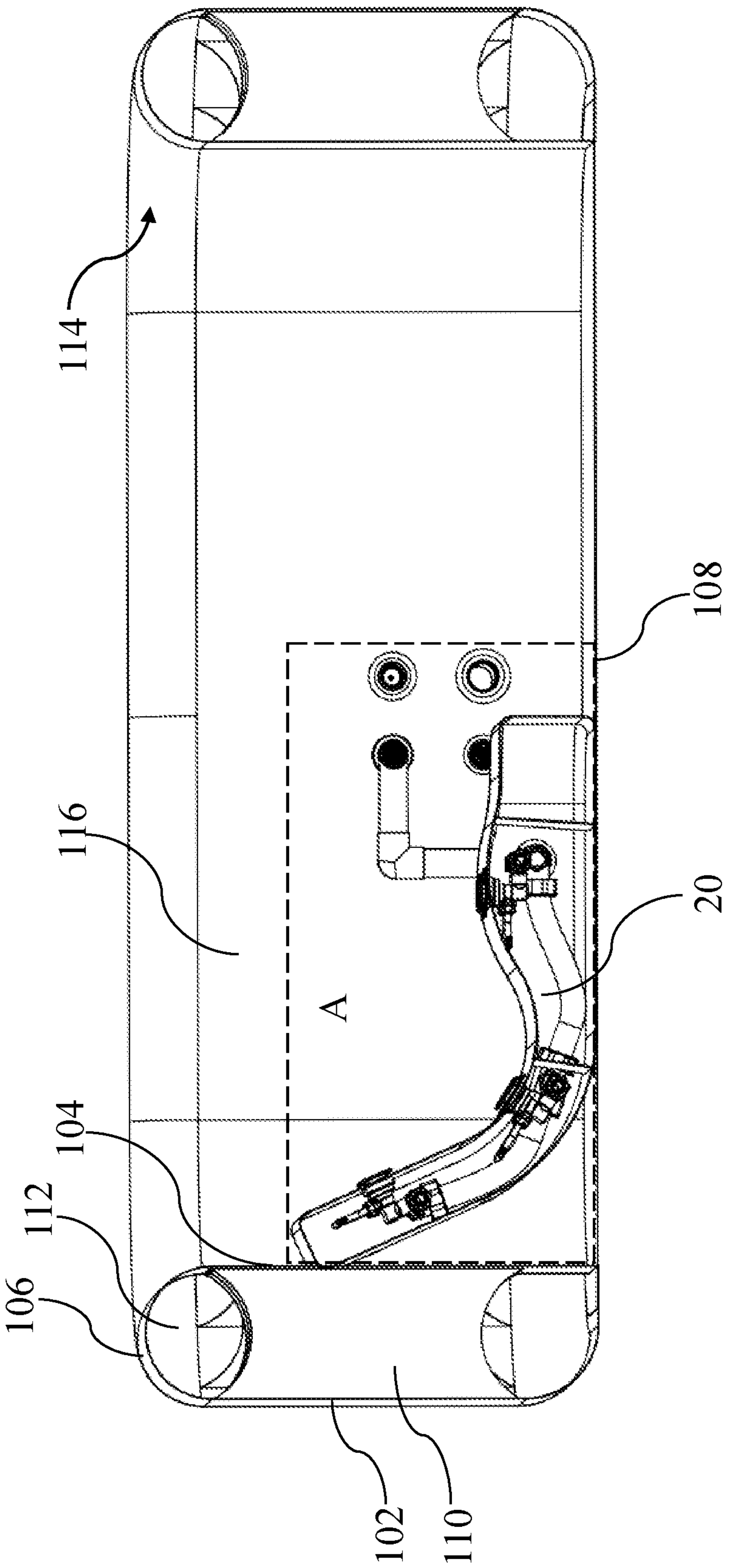
FIG. 2 is a cross-sectional view of the inflatable massage pool with a built-in inflatable seat according to the first example embodiment.

Referring to FIGS. 1 and 2, the inflatable massage pool 1 according to the first example embodiment comprises a pool body 10, an inflatable seat 20, and a fluid delivery assembly 30.

The pool body 10 comprises an external wall 102, an internal wall 104, a top wall 106, a bottom wall 108, and a plurality of tensioning members 110. It should be noted that the walls described herein may alternately be referred to as "sheets." Respective top edges of the external wall 102 and the internal wall 104 are connected to the top wall 106, and respective bottom edges of the external wall 102 and the internal wall 104 are connected to the bottom wall 108. The external wall 102, the internal wall 104, the top wall 106, and the portion of the bottom wall 108 which is located between a joint between the external wall 102 and the bottom wall 108 and a joint between the internal wall 104 and the bottom wall 108, jointly form an inflatable side wall 114 defining a first air chamber 112. The inflatable side wall 114 and the bottom wall 108 jointly define a water containing cavity 116.

The plurality of tensioning members 110 are arranged in the first air chamber 112 and are arranged at intervals in a circumferential direction of the inflatable side wall 114. Each tensioning member 110 may be a sheet, and opposite side edges of each tensioning member 110 may be respectively connected to the external wall 102 and the internal wall 104, thus aiding in maintaining the pool body 10 in a predetermined shape when fully inflated.

The mutual connections among the external wall 102, the internal wall 104, the top wall 106, the bottom wall 108, and the plurality of tensioning members 110 may be implemented by means of welding or bonding. The external wall 102, the internal wall 104, the top wall 106, the bottom wall 108, and the plurality of tensioning members 110 may be made from at least one of polyvinyl chloride (PVC), polyurethane (PU), a laminated PVC mesh material, a laminated PU mesh material, a thermoplastic polyurethane elastomer (TPU), and any one or more of other suitable materials.

Figure 3:
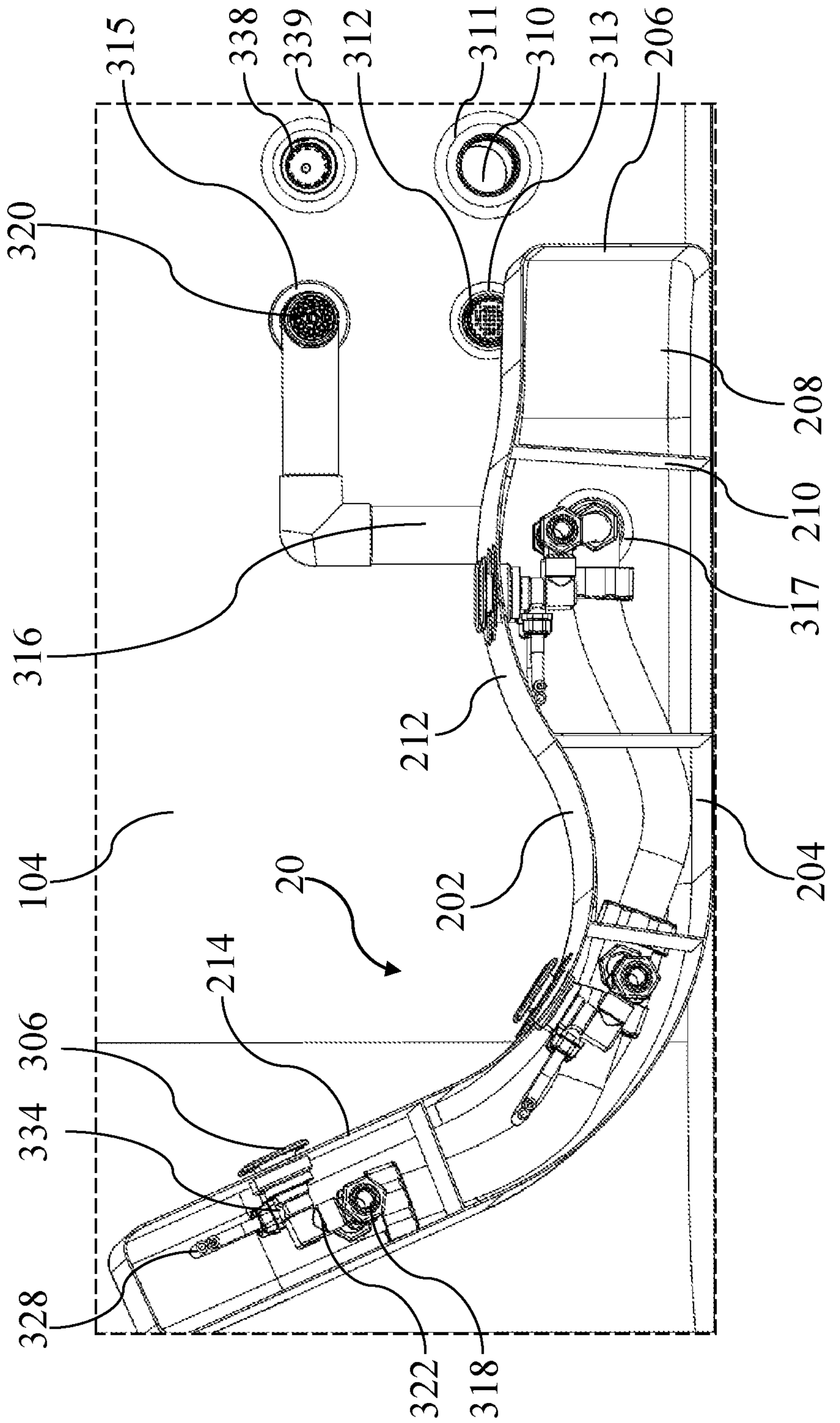
FIG. 3 is a partial enlarged view of a region A of FIG. 2.
Figure 4:
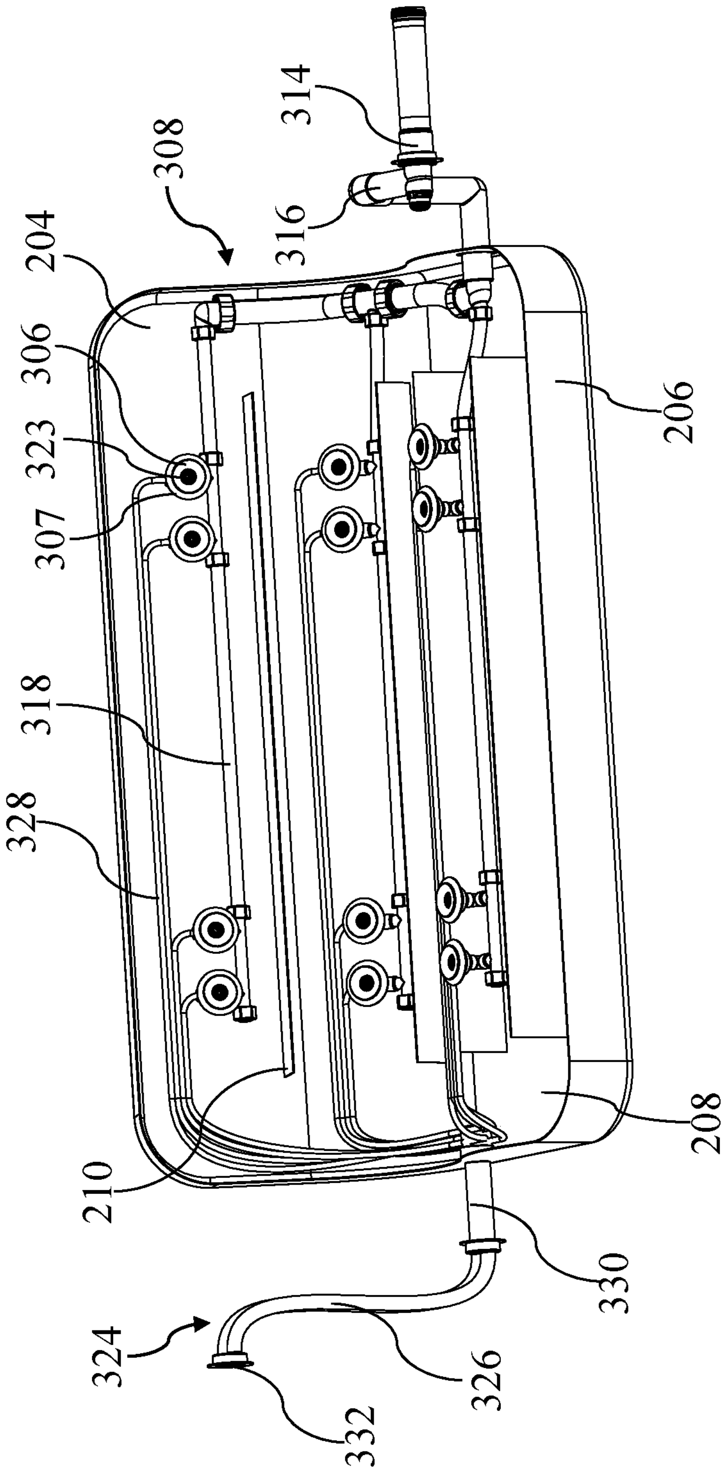
FIG. 4 is a partial perspective view of the inflatable massage pool with a built-in inflatable seat according to the first example embodiment, showing an inflatable seat, with a top sheet of the inflatable seat omitted.

Referring to FIGS. 1, 3 and 4, the inflatable seat 20 is arranged in the water containing cavity 116 and comprises a top sheet 202, a bottom sheet 204, and a side enclosure sheet 206. The top sheet 202, the bottom sheet 204, and the side enclosure sheet 206 are connected to one another to jointly define a second air chamber 208 therein. The top sheet 202 is configured to make contact with and support a user, and the bottom sheet 204 is connected to the bottom wall 108 so as to fix the inflatable seat 20 to the pool body 10. The inflatable seat 20 further comprises a plurality of seat tensioning members 210. The plurality of seat tensioning members 210 are arranged at intervals in the second air chamber 208, each seat tensioning member 210 may be a sheet, and opposite side edges of each seat tensioning member 210 may be respectively connected to the top sheet 202 and the bottom sheet 204, this aiding in maintaining the inflatable seat 20 in a predetermined shape when fully inflated. The connections among the top sheet 202, the bottom sheet 204, the side enclosure sheet 206, and the plurality of seat tensioning members 210 may be implemented by means of welding or bonding. The top sheet 202, the bottom sheet 204, the side enclosure sheet 206, and the plurality of seat tensioning members 210 may be made from at least one of PVC, PU, a laminated PVC mesh material, a laminated PU mesh material, a TPU, and any one or more of other suitable materials.

In the illustrated example embodiment, the inflatable seat 20 is in the form of an inflatable lounge and comprises a seat portion 212 for a user to sit on and a backrest portion 214 for supporting the back and waist of the user. The backrest portion 214 and the seat portion 212 form an obtuse angle so as to allow the user to recline comfortably. It should be understood that in any one or more of the example embodiments described herein, the inflatable seat may have any of a number of other suitable configurations. For example, the inflatable seat may further comprise a neck pillow, armrests, etc. In the illustrated example embodiment, one inflatable seat is arranged in the water containing cavity 116. According to one or more example embodiments, a plurality of inflatable seats may be arranged in the water containing cavity.

Figure 5:
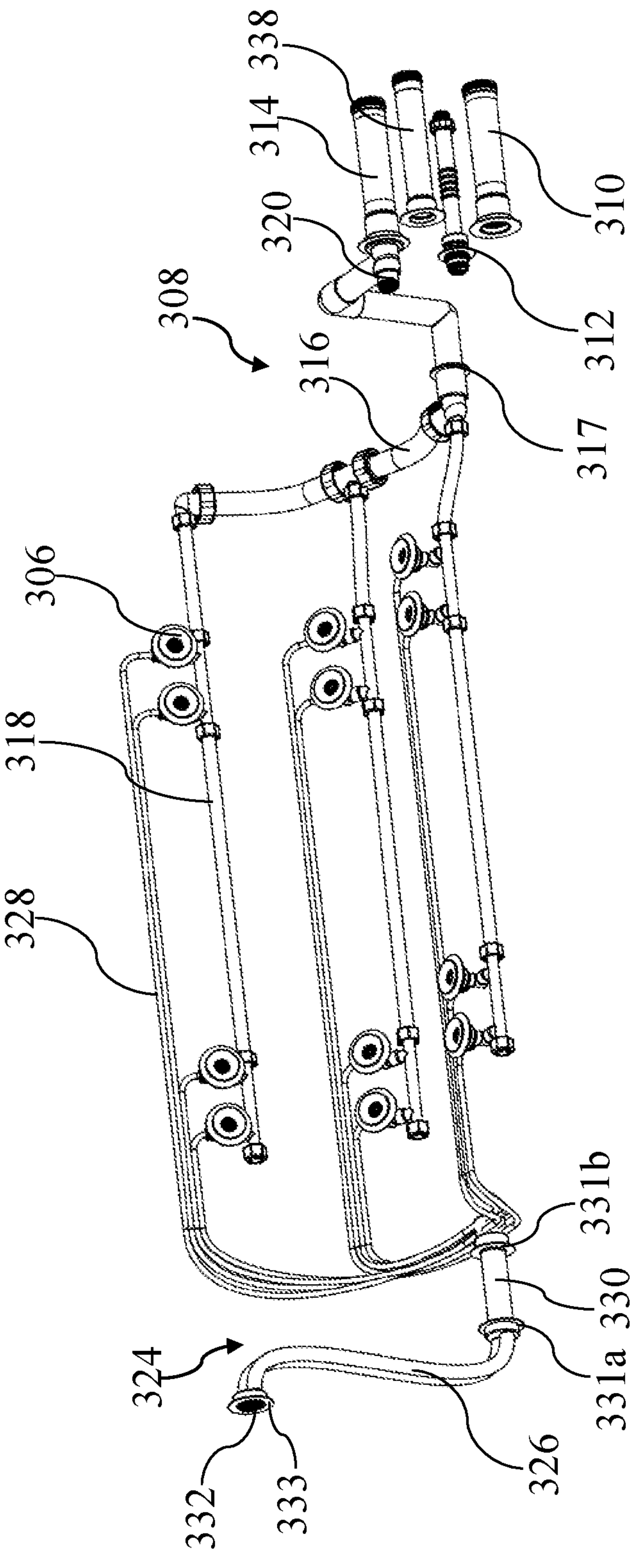
FIG. 5 is a structural schematic diagram of a fluid delivery assembly of the inflatable massage pool with a built-in inflatable seat according to the first example embodiment, with a pumping unit omitted.

Referring to FIGS. 1, 3, and 5, the fluid delivery assembly 30 may implement massage water circulation and filtered water circulation. The fluid delivery assembly 30 comprises a water outlet pipeline 302, a pumping unit 304, a fluid supply pipeline 305, and a plurality of massage spray heads 306. The fluid supply pipeline 305 comprises a water supply pipeline 308.

The water outlet pipeline 302 is arranged substantially within the inflatable side wall 114, and the water outlet pipeline 302 is in fluid communication with the water containing cavity 116 to enable water to be drawn from the water containing cavity 116. The pumping unit 304 is arranged outside the inflatable massage pool 1 (that is, on a side of the inflatable side wall 114 facing away from the water containing cavity 116), and the pumping unit 304 is connected to the water outlet pipeline 302 and to the water supply pipeline 308 and controls the water outlet pipeline 302 to deliver a water flow towards the water supply pipeline 308. At least a part of the water supply pipeline 308 extends into the second air chamber 208 of the inflatable seat 20 from the inflatable side wall 114 and is connected to the plurality of massage spray heads 306 in the second air chamber 208. The water supply pipeline 308 is in fluid communication with the plurality of massage spray heads 306 so as to supply water to the plurality of massage spray heads 306. The plurality of massage spray heads 306 are mounted to the inflatable seat 20 and are at least partially disposed in the second air chamber 208. The plurality of massage spray heads 306 are configured to spray the water flow from the water supply pipeline 308 into the water containing cavity 116. In this way, the water flow drawn from the water containing cavity 116 by the water outlet pipeline 302 may return to the water containing cavity 116 through the pumping unit 304, the water supply pipeline 308 and the plurality of massage spray heads 306. The plurality of massage spray heads 306 are mounted to the inflatable seat 20 to enable a user to be massaged by the water flow from the massage spray heads 306 by lying or sitting on the inflatable seat 20, without the need for the user to deliberately adjust their posture. The plurality of massage spray heads 306 may be arranged in multiple zones of the inflatable seat to provide multi-directional massage, so that the user can obtain a more comfortable massage experience.

Referring to FIGS. 1 and 3, the water outlet pipeline 302 comprises a massage water outlet pipe 310 and a filtered water outlet pipe 312. Under the action of the pumping unit 304, the massage water outlet pipe 310 and the filtered water outlet pipe 312 each draw the water from the water containing cavity 116, and then respectively deliver a massage water flow and a filtered water flow to the water supply pipeline 308. The massage water flow and the filtered water flow pass through the water supply pipeline 308 and are then sprayed into the water containing cavity 116 from the plurality of massage spray heads 306, thereby implementing massage water circulation and filtered water circulation. The flow rate of the massage water flow may be greater than that of the filtered water flow. According to one or more example embodiments, the pumping unit 304 may comprise a filtered water pump and a massage water pump (hereinafter also collectively referred to as water pumps) for pumping the filtered water flow and the massage water flow respectively. According to one or more example embodiments, the pumping unit 304 may comprise a power-adjustable water pump, which operates at a higher power when pumping the massage water flow and at a lower power when pumping the filtered water flow.

In the illustrated example embodiment, the massage water flow and the filtered water flow are both sprayed from the plurality of massage spray heads 306 into the water containing cavity 116. According to one or more example embodiments, the filtered water flow may flow back into the water containing cavity by means of other pipes rather than being sprayed from the plurality of massage spray heads into the water containing cavity.

In the illustrated example embodiment, the massage water outlet pipe 310 and the filtered water outlet pipe 312 are both disposed substantially within the inflatable side wall 114. The inflatable side wall 114 comprises a first sleeve for receiving the massage water outlet pipe 310. Opposite ends of the first sleeve are hermetically connected (e.g., welded) to the external wall 102 and the internal wall 104 of the inflatable side wall 114 respectively, such that a hollow interior of the first sleeve is not in fluid communication with the first air chamber 112 of the inflatable side wall 114. The massage water outlet pipe 310 extends through the first sleeve, and a fixing flange 311 on the massage water outlet pipe 310 is hermetically fixed (e.g., welded) to the internal wall 104. A water intake end of the massage water outlet pipe 310 is in fluid communication with the water containing cavity 116, and a water discharge end of the massage water outlet pipe 310 is in fluid communication with a water pump of the pumping unit 304 to allow the massage water to flow from the massage water outlet pipe 310 to the pumping unit 304.

Similar to a fixing method of the massage water outlet pipe 310, the filtered water outlet pipe 312 may extend through a second sleeve of the inflatable side wall 114 that is configured to receive the filtered water outlet pipe 312, and a fixing flange 313 on the filtered water outlet pipe 312 may be hermetically fixed (e.g., welded) to the internal wall 104 of the inflatable side wall 114. A water intake end of the filtered water outlet pipe 312 is in fluid communication with the water containing cavity 116, and a water discharge end of the filtered water outlet pipe 312 is in fluid communication with the water pump of the pumping unit 304 to allow the filtered water to flow from the filtered water outlet pipe 312 to the pumping unit 304.

Referring to FIGS. 1, 3, 4 and 5, the water supply pipeline 308 comprises a primary water supply pipe 314, an intermediate water supply pipeline 316, and at least one secondary water supply pipe 318, and the at least one secondary water supply pipe 318 is connected to and in fluid communication with the primary water supply pipe 314 by means of the intermediate water supply pipeline 316.

The primary water supply pipe 314 is at least partially disposed within the inflatable side wall 114 and is connected to and in fluid communication with the water pump of the pumping unit 304. In the illustrated example embodiment, the primary water supply pipe 314 is in the form of a substantially straight tube and extends into the water containing cavity 116 through the inflatable side wall 114. Similar to the fixing method of the massage water outlet pipe 310, the primary water supply pipe 314 extends through a third sleeve of the inflatable side wall 114 that is configured to receive the primary water supply pipe 314, and a fixing flange 315 on the primary water supply pipe 314 is hermetically fixed (e.g., welded) to the internal wall 104 of the inflatable side wall 114. A water intake end of the primary water supply pipe 314 is in fluid communication with the water pump of the pumping unit 304, and a water discharge end of the primary water supply pipe 314 is in fluid communication with a water intake end of the intermediate water supply pipeline 316. The primary water supply pipe 314 is provided with an exhaust port 320 at or near the water discharge end thereof, so as to prevent the pumping unit 304 from failing to start normally due to the accumulation of air in the pumping unit 304.

The intermediate water supply pipeline 316 extends from the water containing cavity 116 into the second air chamber 208 of the inflatable seat 20. A fixing flange 317 on the intermediate water supply pipeline 316 is hermetically fixed (e.g., welded) to the side enclosure sheet 206 of the inflatable seat 20, and is thus fixed to the inflatable seat 20.

The at least one secondary water supply pipe 318 is located substantially within the second air chamber 208 of the inflatable seat 20 and is connected to and in fluid communication with the primary water supply pipe 314 by means of the intermediate water supply pipeline 316. Each secondary water supply pipe 318 is configured to supply a water flow from the primary water supply pipe 314 to at least one of the plurality of massage spray heads 306.

In the illustrated example embodiment, each massage spray head 306 is substantially disposed within the second air chamber 208 of the inflatable seat 20 and is hermetically fixed (e.g., welded) to the top sheet 202 of the inflatable seat 20 by means of a fixing flange 307 thereon. Each massage spray head 306 comprises a water intake portion 322 (see FIG. 3) located in the second air chamber 208, and a nozzle 323 (see FIG. 4) facing the water containing cavity 116 and in fluid communication with the water containing cavity 116. The water intake portion 322 is connected to and in fluid communication with the corresponding secondary water supply pipe 318, such that the water flow from the water supply pipeline 308 can enter the massage spray head 306 and be sprayed into the water containing cavity 116 from the nozzle 323.

In the illustrated example embodiment, the water supply pipeline 308 comprises three secondary water supply pipes 318, and the three secondary water supply pipes 318 are arranged substantially parallel to one another and are each substantially parallel to the corresponding seat tensioning members 210. Each secondary water supply pipe 318 is arranged between two adjacent seat tensioning members 210 or between the side enclosure sheet 206 and the adjacent seat tensioning member 210, and each secondary water supply pipe 318 is connected to and in fluid communication with the four massage spray heads 306 arranged in a length direction thereof. In this way, the massage spray heads 306 are arranged at multiple positions along the backrest portion 214 and the seat portion 212 of the inflatable seat 20, so that multiple parts of the body of the user can all be massaged and relaxed when the user is lying or seating on the inflatable seat 20. According to one or more example embodiments, the water supply pipeline may alternatively comprise another suitable number of secondary water supply pipes according to actual desire, and each secondary water supply pipe may also be connected to and in fluid communication with another suitable number of massage spray heads.

In the illustrated example embodiment, the portion of the intermediate water supply pipeline 316 located in the second air chamber 208 is arranged in a gap between longitudinal end portions of the seat tensioning members 210 and the side enclosure sheet 206. In the illustrated example embodiment, one inflatable seat 20 is arranged in the water containing cavity 116, and correspondingly, the intermediate water supply pipeline 316 provides one intermediate water supply channel extending into the second air chamber 208 of the inflatable seat 20. It can be understood that in some other example embodiments where more than one inflatable seat is disposed in the water containing cavity, the intermediate water supply pipeline may be configured to be divertible (for example, including branch pipes) to provide more than one intermediate water supply channel extending into the second air chambers of the inflatable seats, so as to supply the water flow from the primary water supply pipe to the secondary water supply pipes inside the inflatable seats.

It should be understood that the configuration of the water supply pipeline as described above is not limiting, and may be modified according to actual conditions.

Referring to FIGS. 1, 3, 4 and 5, the fluid supply pipeline 305 further comprises a first air supply pipeline 324. At least a part of the first air supply pipeline 324 extends into the second air chamber 208 of the inflatable seat 20 from the inflatable side wall 114 and is connected to the plurality of massage spray heads 306 in the second air chamber 208. The first air supply pipeline 324 is in fluid communication with the plurality of massage spray heads 306 to supply air to the plurality of massage spray heads 306. The massage spray heads 306 can mix the water flow entering the massage spray heads 306 with an air flow to form bubbled water bringing a soft tactile sense, thereby improving the massage experience for the user.

The first air supply pipeline 324 comprises a primary air supply pipe 326 and at least one secondary air supply pipe 328. The primary air supply pipe 326 is arranged substantially within the first air chamber 112 of the inflatable side wall 114 and is in fluid communication with an external space of the inflatable massage pool 1. The at least one secondary air supply pipe 328 is arranged substantially within the second air chamber 208 and is in fluid communication with the primary air supply pipe 326. Each secondary air supply pipe 328 is adapted to supply an air flow from the primary air supply pipe 326 to at least one of the plurality of massage spray heads 306.

In the illustrated example embodiment, the first air supply pipeline 324 comprises one air intake member 332, two primary air supply pipes 326, one intermediate air supply pipeline 330, and twelve secondary air supply pipes 328. The air intake member 332 is arranged on the external wall 102 of the inflatable side wall 114, and the air intake member 332 is hermetically fixed (e.g., welded) to the external wall 102 of the inflatable side wall 114 by means of a fixing flange 333 disposed thereon. An air intake end of each primary air supply pipe 326 is in fluid communication with the external space of the inflatable massage pool 1 by means of the air intake member 332. An air discharge end of each primary air supply pipe 326 is connected to and in fluid communication with an air intake end of the intermediate air supply pipeline 330. The intermediate air supply pipeline 330 extends substantially through the water containing cavity 116 into the second air chamber 208 of the inflatable seat 20 from the internal wall 104 of the inflatable side wall 114. Opposite ends of the intermediate air supply pipeline 330 are hermetically fixed (e.g., welded) to the internal wall 104 of the inflatable side wall 114 and to the side enclosure sheet 206 of the inflatable seat 20, respectively, by means of two fixing flanges 331*a*, 331*b* disposed thereon. An air discharge end of the intermediate air supply pipeline 330 is connected to and in fluid communication with air intake ends of the twelve secondary air supply pipes 328. Each massage spray head 306 further comprises an air intake portion 334 (see FIG. 3) located in the second air chamber 208 of the inflatable seat 20. An air discharge end of each secondary air supply pipe 328 is connected to and in fluid communication with the air intake portion 334 of one corresponding massage spray head 306 to supply the air flow from the primary air supply pipe 326 to the corresponding massage spray head 306.

In the illustrated example embodiment, when the water flow is supplied to the massage spray heads 306 by means of the water supply pipeline 308, the air in the external space of the inflatable massage pool 1 may be drawn into the massage spray heads 306 through the first air supply pipeline 324 due to a siphon effect and is thus mixed with the water flow in the massage spray heads 306 to form bubbled water which is then sprayed from the massage spray heads 306. In other words, in the illustrated example embodiment, ambient air is passively supplied to the massage spray heads 306 through the first air supply pipeline 324. It can be understood that in some other example embodiments, the ambient air may also or alternately be actively supplied by an air pump to the massage spray heads 306 through the first air supply pipeline 324.

In the illustrated example embodiment, each secondary air supply pipe 328 is arranged between two adjacent seat tensioning members 210 and/or between the side enclosure sheet 206 and the corresponding seat tensioning member 210, and each secondary air supply pipe 328 is connected to and in fluid communication with one massage spray head 306. It can be understood that in other example embodiments, each secondary air supply pipe may alternately be connected to and in fluid communication with another appropriate number of massage spray heads as desired.

In the illustrated example embodiment, the first air supply pipeline 324 comprises two primary air supply pipes 326. It can be understood that in some other example embodiments, the first air supply pipeline may alternately comprise one or more than two primary air supply pipes. In the illustrated example embodiment, one inflatable seat 20 is arranged in the water containing cavity 116, and correspondingly, the intermediate air supply pipeline 330 provides one intermediate air supply channel extending into the second air chamber 208 of the inflatable seat 20. It can be understood that in some other example embodiments where more than one inflatable seat is disposed in the water containing cavity, the intermediate air supply pipeline may be configured to be divertible (for example, including branch pipes) to provide more than one intermediate air supply channel extending into the second air chambers of the inflatable seats, so as to supply the air flow from the primary air supply pipe to the secondary air supply pipes inside the inflatable seats.

It should be understood that the above-described configuration of the first air supply pipeline is not limiting, and may be modified according to actual conditions.

Referring to FIGS. 1 and 3, the fluid supply pipeline 305 further comprises a second air supply pipeline 336. The pumping unit 304 comprises an air pump in fluid communication with the second air supply pipeline 336. The inflatable massage pool 1 may comprise a wave-making unit (not shown) in fluid communication with the second air supply pipeline 336. The wave-making unit may have a plurality of wave-making holes (not shown) in fluid communication with the water containing cavity. The wave-making unit may be arranged on the pool body 10 or the inflatable seat 20. For example, the wave-making unit may be disposed on the bottom wall 108 of the pool body 10 around the inflatable seat 20, or on the top sheet 202 of the inflatable seat 20. The second air supply pipeline 336 may comprise a primary air intake pipe 338 and a secondary air intake pipe (not shown), the primary air intake pipe 338 is substantially disposed in the inflatable side wall 114 and is connected to and in fluid communication with the air pump of the pumping unit 304. Similar to the fixing method of the massage water outlet pipe 310, the primary air intake pipe 338 may extend through a fourth sleeve of the inflatable side wall 114 that is configured to receive the primary air intake pipe 338, and a fixing flange 339 on the primary air intake pipe 338 may be hermetically fixed (e.g., welded) to the internal wall 104 of the inflatable side wall 114. The wave-making unit may be in fluid communication with the primary air intake pipe 338 by means of the secondary air intake pipe. In this way, the air from the air pump of the pumping unit 304 may be supplied to the wave-making unit through the second air supply pipeline 336, and may enter the water in the water containing cavity 116 through the wave-making holes of the wave-making unit to form air bubbles for massage, further improving the massage experience for the user. It can be understood that in some other example embodiments, the second air supply pipeline and the wave-making unit may not be provided.

FIGS. 6 to 11 show an inflatable massage pool with built-in inflatable seats according to a second example embodiment. The main difference between the inflatable massage pool according to the second example embodiment and the inflatable massage pool according to the first example embodiment lies in the configuration of the fluid delivery assembly. The differences between the two example embodiments will be described below.

Figure 6:
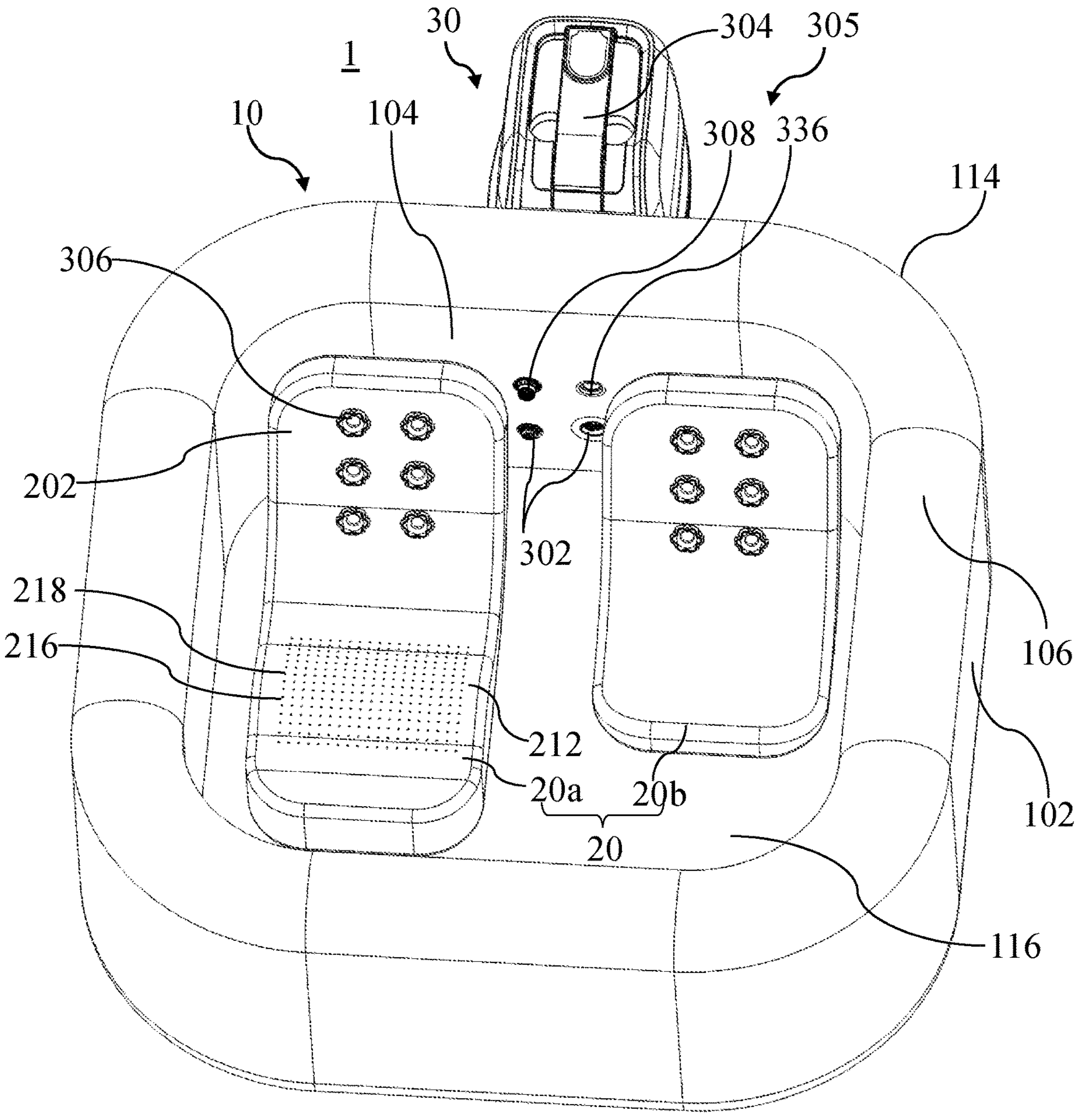
FIG. 6 is a perspective view of an inflatable massage pool with built-in inflatable seats according to a second example embodiment.
Figure 7:
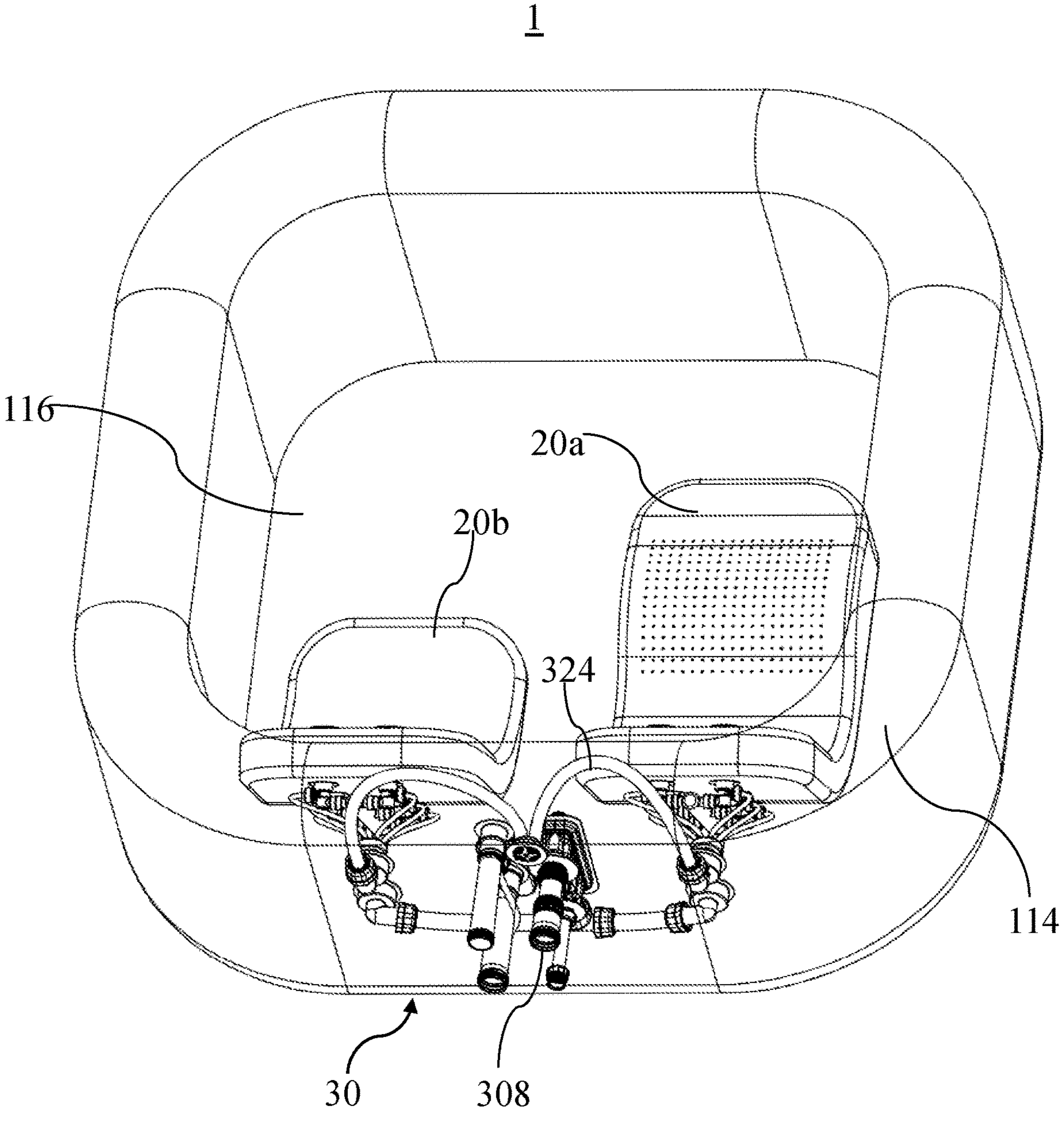
FIG. 7 is a perspective view of the inflatable massage pool with built-in inflatable seats according to the second example embodiment.
Figure 8:
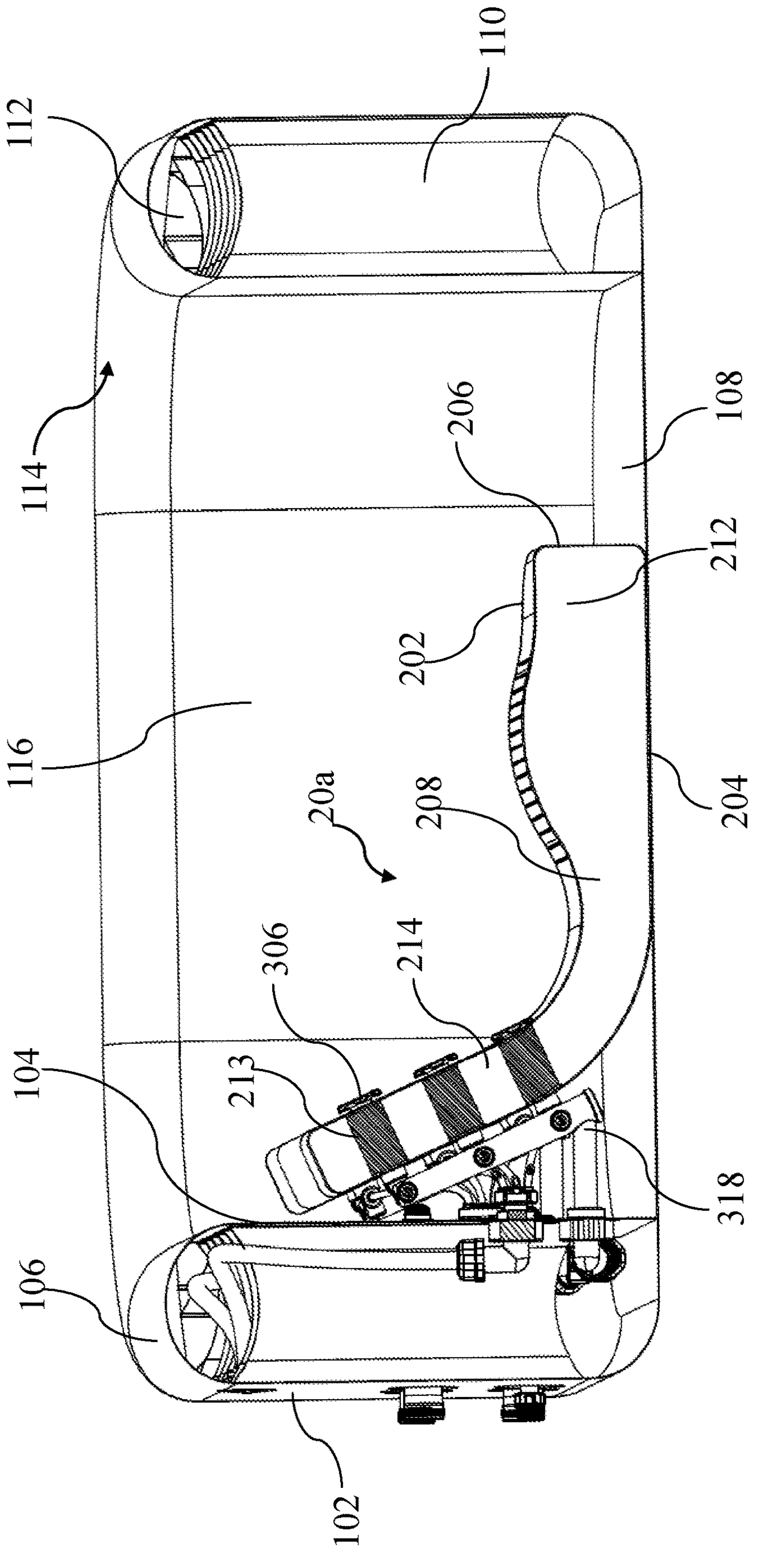
FIG. 8 is a cross-sectional view of the inflatable massage pool with built-in inflatable seats according to the second example embodiment.
Figure 9:
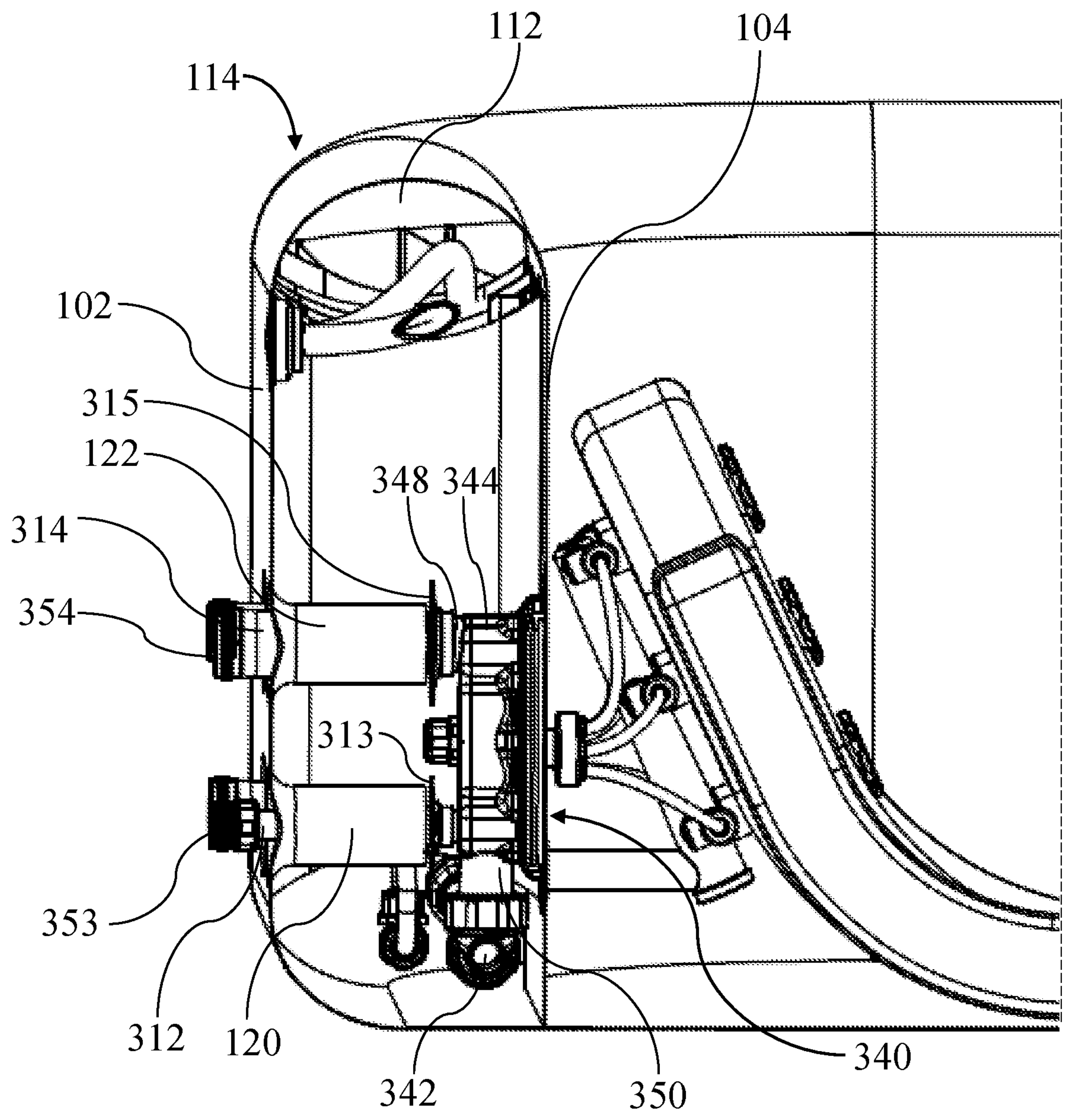
FIG. 9 is a partial cross-sectional view of the inflatable massage pool with built-in inflatable seats according to the second example embodiment.

Referring to FIGS. 6 to 8, the inflatable massage pool 1 according to the second example embodiment comprises a pool body 10, inflatable seats 20, and a fluid delivery assembly 30.

The pool body 10 comprises an external wall 102, an internal wall 104, a top wall 106, a bottom wall 108, and a plurality of tensioning members 110. Respective top edges of the external wall 102 and the internal wall 104 are connected to the top wall 106, and respective bottom edges of the external wall 102 and the internal wall 104 are connected to the bottom wall 108. The external wall 102, the internal wall 104, the top wall 106, and the portion of the bottom wall 108, which is located between a joint between the external wall 102 and the bottom wall 108 and a joint between the internal wall 104 and the bottom wall 108, jointly form an inflatable side wall 114 defining therein a first air chamber 112. The inflatable side wall 114 and the bottom wall 108 jointly define a water containing cavity 116. The plurality of tensioning members 110 are disposed in the first air chamber 112 and are arranged at intervals in a circumferential direction of the inflatable side wall 114. Each tensioning member 110 may be a sheet, and opposite side edges of each tensioning member 110 are respectively connected to the external wall 102 and the internal wall 104, thus aiding the maintaining of the pool body 10 in a predetermined shape when fully inflated.

In the illustrated example embodiment, a first inflatable seat 20*a* and a second inflatable seat 20*b* (which may be collectively referred to as inflatable seats 20 herein) are disposed in the water containing cavity 116. The first inflatable seat 20*a* and the second inflatable seat 20*b* have similar structures, and are each in the form of an inflatable lounge. The first inflatable seat 20*a* and the second inflatable seat 20*b* each comprise a seat portion 212 for a user to sit on and a backrest portion 214 for supporting the back and waist of the user. The backrest portion 214 and the seat portion 212 form an obtuse angle so as to allow the user to recline comfortably. The main difference between the first inflatable seat 20*a* and the second inflatable seat 20*b* lies in that, as compared with the second inflatable seat 20*b*, a size of the seat portion 212 of the first inflatable seat 20*a* is larger than that of the seat portion of the second inflatable seat 20*b*, so that a larger supporting area can be provided for the legs of the user.

A structure of the inflatable seat will be described below by taking the first inflatable seat 20*a* as an example. The first inflatable seat 20*a* comprises a top sheet 202, a bottom sheet 204, and a side enclosure sheet 206. The top sheet 202, the bottom sheet 204, and the side enclosure sheet 206 are hermetically connected to one another to jointly define a second air chamber 208 therein. The top sheet 202 is configured to make contact with and to support a user, and the bottom sheet 204 is connected to the bottom wall 108 so as to fix the inflatable seat 20 to the pool body 10. The inflatable seat 20 may further comprises a plurality of seat tensioning members 210. Each seat tensioning member 210 may be a sheet, and opposite side edges of each seat tensioning member 210 are respectively connected to the top sheet 202 and the bottom sheet 204, thus helping to maintain the inflatable seat 20 in a predetermined shape when fully inflated. Similarly, the second inflatable seat 20*b* is also provided with a second air chamber. It can be understood that in some other example embodiments, either one or both of the first and second inflatable seats 20*a* and 20*b* may have other suitable configurations.

Continuing to refer to FIGS. 6 to 8, the fluid delivery assembly 30 can implement massage water circulation and filtered water circulation. The fluid delivery assembly 30 comprises a water outlet pipeline 302, a pumping unit 304, a fluid supply pipeline 305, and a plurality of massage spray heads 306. The fluid supply pipeline comprises a water supply pipeline 308.

The water outlet pipeline 302 is substantially disposed within the inflatable side wall 114, and the water outlet pipeline 302 is in fluid communication with the water containing cavity 116 to draw water from the water containing cavity 116. The pumping unit 304 is arranged outside the inflatable massage pool 1 (that is, on the side of the inflatable side wall 114 facing away from the water containing cavity 116), and the pumping unit 304 is connected to the water outlet pipeline 302 and the water supply pipeline 308 and controls the water outlet pipeline 302 to deliver a water flow towards the water supply pipeline 308. At least a part of the water supply pipeline 308 extends into the water containing cavity 116 from the inflatable side wall 114 and is connected to the plurality of massage spray heads 306 in the water containing cavity 116. The water supply pipeline 308 is in fluid communication with the plurality of massage spray heads 306 so as to supply water to the plurality of massage spray heads 306. The plurality of massage spray heads 306 are mounted to the inflatable seat 20 and are at least partially disposed within the inflatable seat 20, and the plurality of massage spray heads 306 are configured to spray the water flow from the water supply pipeline 308 into the water containing cavity 116. In this way, the water flow drawn by the water outlet pipeline 302 from the water containing cavity 116 may return to the water containing cavity 116 through the pumping unit 304, the water supply pipeline 308, and the plurality of massage spray heads 306.

Figure 10:
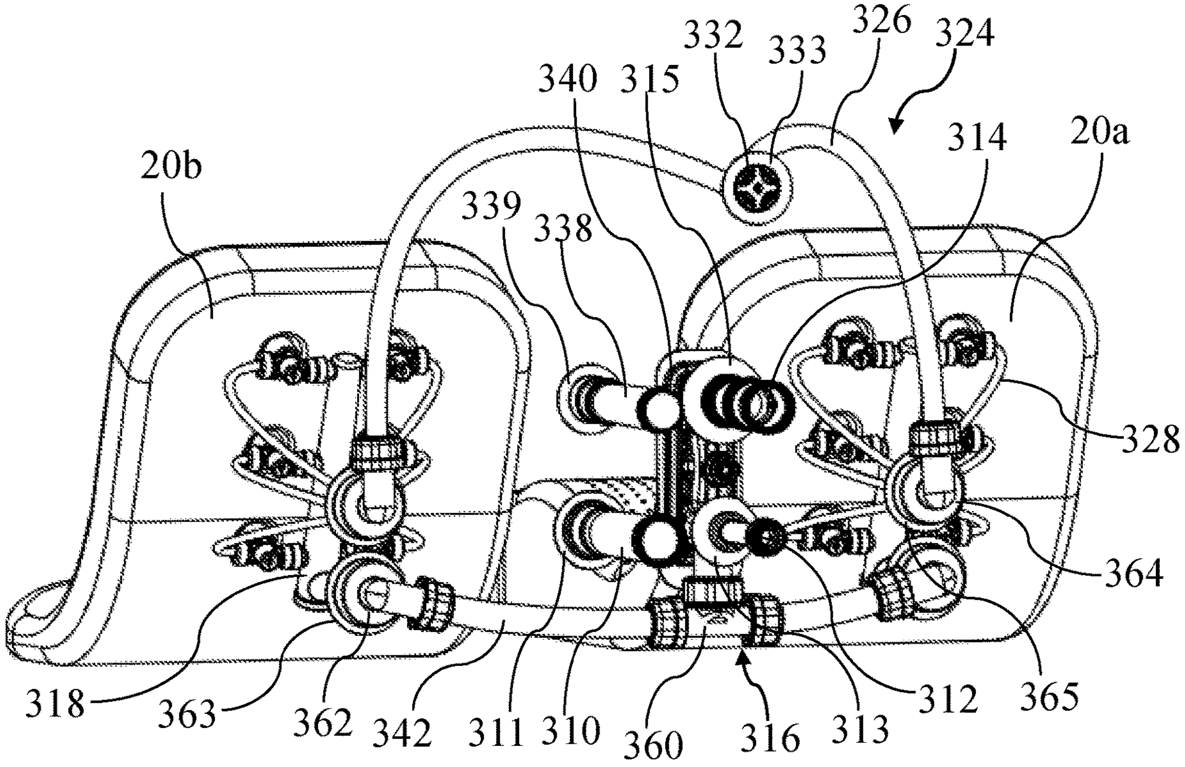
FIG. 10 is a structural schematic diagram showing the inflatable seats and a fluid delivery assembly of the inflatable massage pool with built-in inflatable seats according to the second example embodiment, with a pumping unit omitted.
Figure 11:
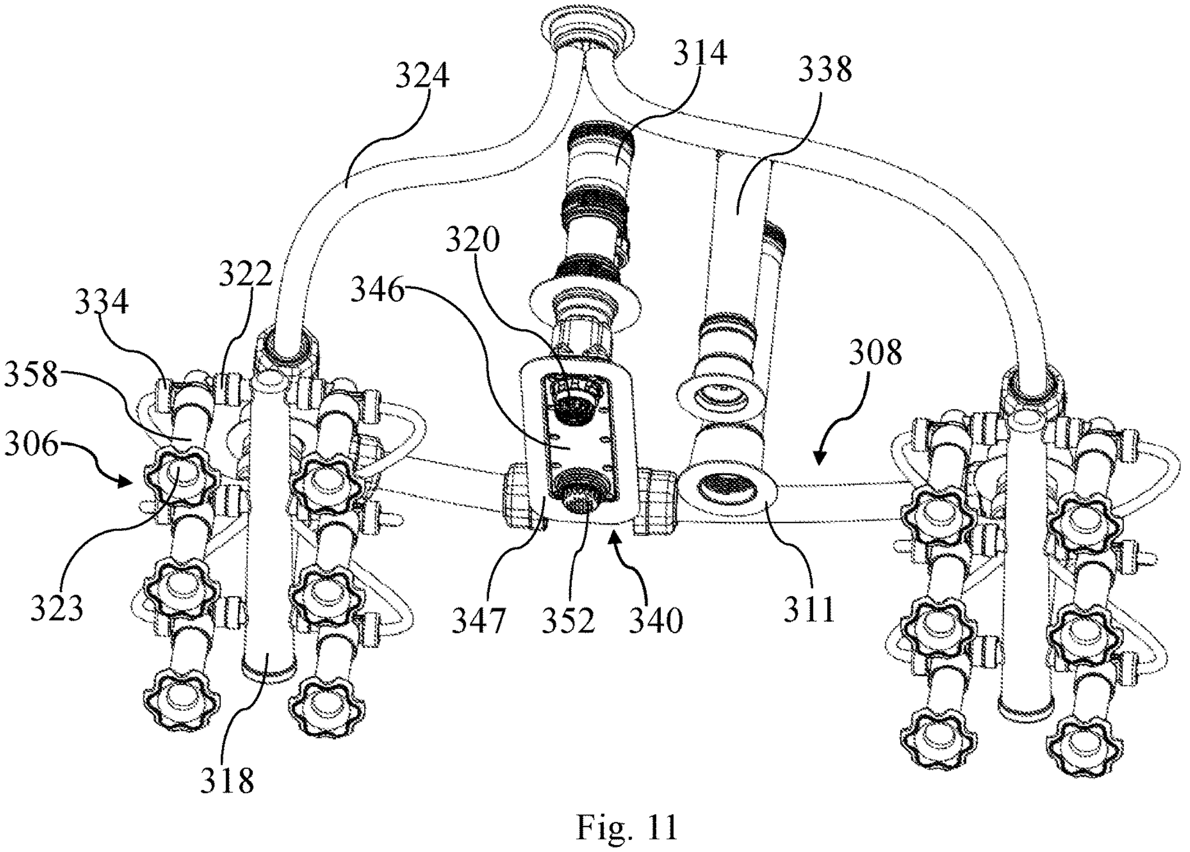
FIG. 11 is a structural schematic diagram of the fluid delivery assembly of the inflatable massage pool with built-in inflatable seats according to the second example embodiment, with the pumping unit omitted.

Referring to FIGS. 6, 10 and 11, the water outlet pipeline 302 comprises a massage water outlet pipe 310 and a filtered water outlet pipe 312. The pumping unit 304 comprises a water pump. Under the action of the water pump of the pumping unit 304, the massage water outlet pipe 310 and the filtered water outlet pipe 312 each draw the water from the water containing cavity 116, and respectively deliver a massage water flow and a filtered water flow to the water supply pipeline 308. The massage water flow and the filtered water flow pass through the water supply pipeline 308 and are then sprayed into the water containing cavity 116 from the plurality of massage spray heads 306, thereby implementing massage water circulation and filtered water circulation.

In the illustrated example embodiment, the massage water outlet pipe 310 and the filtered water outlet pipe 312 are both substantially disposed within the inflatable side wall 114. The inflatable side wall 114 comprises a first sleeve for receiving the massage water outlet pipe 310. Opposite ends of the first sleeve are hermetically connected (e.g., welded) to the external wall 102 and the internal wall 104 of the inflatable side wall 114 respectively, such that a hollow interior of the first sleeve is not in fluid communication with the first air chamber 112 of the inflatable side wall 114. The massage water outlet pipe 310 extends through the first sleeve, and a fixing flange 311 on the massage water outlet pipe 310 is hermetically fixed (e.g., welded) to the internal wall 104. A water intake end of the massage water outlet pipe 310 is in fluid communication with the water containing cavity 116, and a water discharge end of the massage water outlet pipe 310 is in fluid communication with a water pump of the pumping unit 304 to allow the massage water to flow from the massage water outlet pipe 310 to the pumping unit 304. An example layout and fixation method for the filtered water outlet pipe 312 will be described below.

Referring to FIGS. 7 to 11, the water supply pipeline 308 comprises a primary water supply pipe 314, an intermediate water supply pipeline 316, and at least one secondary water supply pipe 318, and the at least one secondary water supply pipe 318 is connected to and in fluid communication with the primary water supply pipe 314 by means of the intermediate water supply pipeline 316.

The primary water supply pipe 314 is at least partially disposed within the inflatable side wall 114 and is connected to and in fluid communication with the water pump of the pumping unit 304. In the illustrated example embodiment, the primary water supply pipe 314 is in the form of a substantially straight tube. A water intake end of the primary water supply pipe 314 is in fluid communication with the water pump of the pumping unit 304.

The intermediate water supply pipeline 316 is located substantially within the first air chamber 112 of the inflatable side wall 114. The intermediate water supply pipeline 316 comprises a water intake device 340 and a communication pipe 342. The water intake device 340 comprises a housing 344 (see FIG. 9) and a cover plate 346 (FIG. 11). The housing 344 and the cover plate 346 are connected to each other and jointly define a water intake cavity. In the illustrated example embodiment, the cover plate 346 is fixed to the internal wall 104 of the inflatable side wall 114. The cover plate 346 is welded, via a fixing flange 347 formed on an outer periphery thereof, to the inner surface of the internal wall 104 of the inflatable side wall 114 that faces the first air chamber 112. The housing 344 comprises a water inlet 348 and a water outlet 350. The water inlet 348 is connected to and in fluid communication with a water discharge end of the primary water supply pipe 314 to allow the water flow from the primary water supply pipe 314 to enter the water intake cavity through the water inlet 348. The water outlet 350 is in fluid communication with the communication pipe 342 to allow the water from the water intake cavity of the water intake device 340 to enter the communication pipe 342 through the water outlet 350.

In the illustrated example embodiment, the filtered water outlet pipe 312 passes through and is fixed to the water intake device 340. At least a part of the filtered water outlet pipe 312 is disposed within the water intake cavity of the water intake device 340, and the filtered water outlet pipe 312 is not in fluid communication with the water intake cavity. A water intake end 352 of the filtered water outlet pipe 312 is fixed on the cover plate 346 and is in fluid communication with the water containing cavity 116. A water discharge end 353 of the filtered water outlet pipe 312 extends to the outside of the inflatable side wall 114 and is thus connectable to the water pump of the pumping unit 304. The inflatable side wall 114 comprises a second sleeve 120 for receiving the filtered water outlet pipe 312. One end of the second sleeve 120 is hermetically connected (e.g., welded) to the fixing flange 313 on the filtered water outlet pipe 312, and the other end of the second sleeve 120 is hermetically connected (e.g., welded) to the external wall 102 of the inflatable side wall 114, such that the interior of the second sleeve 120 is not in fluid communication with the first air chamber 112. The filtered water outlet pipe 312 at least partially passes through the second sleeve 120.

As mentioned above, the water discharge end of the primary water supply pipe 314 is connected to the water inlet 348 of the water intake device 340. The water intake end 354 of the primary water supply pipe 314 extends to the outside the inflatable side wall 114 and is thereby connectable to the water pump of the pumping unit 304. The inflatable side wall 114 further comprises a third sleeve 122 for receiving the primary water supply pipe 314. One end of the third sleeve 122 is welded to the fixing flange 315 on the primary water supply pipe 314, and the other end of the third sleeve 122 is welded to the external wall 102 of the inflatable side wall 114, such that the interior of the third sleeve 122 is not in fluid communication with the first air chamber 112. The primary water supply pipe 314 at least partially passes through the third sleeve 122.

The cover plate 346 of the water intake device 340 may also include an exhaust port 320 in fluid communication with the water intake cavity, so as to prevent the water pump of the pumping unit 304 from failing to start normally due to the accumulation of air in the water pump of the pumping unit 304.

In the illustrated example embodiment, the intermediate water supply pipeline 316 comprises a three-way joint 360, two communication pipes 342, and two two-way joints 362 in addition to the water intake device 340. Water intake ends of the two communication pipes 342 are in fluid communication with the water outlet 350 of the water intake device 340 by means of the three-way joint 360, and a water discharge end of each communication pipe 342 is in fluid communication with one corresponding secondary water supply pipe 318 by means of one corresponding two-way joint 362 arranged on the internal wall 104 of the inflatable side wall 114. A fixing flange 363 disposed on each two-way joint 362 is hermetically fixed (e.g., welded) to the internal wall 104 of the inflatable side wall 114. The water flow from the primary water supply pipe 314 of the water supply pipeline 308 may be supplied to the respective massage spray heads 306 of the two inflatable seats by means of the intermediate water supply pipeline 316 and the two secondary water supply pipes 318.

Continuing to refer to FIGS. 8, 10 and 11, the at least one secondary water supply pipe 318 is located substantially within the water containing cavity 116 and is connected to and in fluid communication with the primary water supply pipe 314 by means of the intermediate water supply pipeline 316. Each secondary water supply pipe 318 is configured to supply the water flow from the primary water supply pipe 314 to at least one of the plurality of massage spray heads 306.

In the illustrated example embodiment, the fluid delivery assembly 30 comprises twelve massage spray heads 306. The inflatable massage pool 1 comprises two inflatable seats 20, the twelve massage spray heads 306 are divided into two massage spray head groups, and each massage spray head group comprises six massage spray heads 306. Each inflatable seat 20 is provided with one corresponding massage spray head group. In other words, the first inflatable seat 20*a* and the second inflatable seat 20*b* are each provided with six massage spray heads 306. Correspondingly, each inflatable seat 20 comprises six massage spray head receiving portions 213 (see FIG. 8), and each massage spray head receiving portion 213 defines a receiving space which is not in fluid communication with the second air chamber 208 of the inflatable seat 20 and which is configured to receive the corresponding massage spray head 306. Each massage spray head 306 comprises a tubular portion 358 adapted to extend through the receiving space; a water intake portion 322 arranged on the tubular portion 358 and located in the water containing cavity 116; and a nozzle 323 arranged on tubular portion 358 and facing the water containing cavity 116. The water intake portion 322 is connected to and in fluid communication with the corresponding secondary water supply pipe 318, and the nozzle 323 is in fluid communication with the water containing cavity 116, such that the water flow from the water supply pipeline 308 can enter the massage spray head 306 and be sprayed into the water containing cavity 116 from the nozzle 323. Each massage spray head 306 may be welded to the top sheet 202 of the corresponding inflatable seat 20 by means of the fixing flange thereon, and thus be fixed to the corresponding inflatable seat 20.

Since each massage spray head 306 is disposed within the massage spray head receiving portion 213 that is not in fluid communication with the second air chamber 208 of the inflatable seat 20, the plurality of massage spray heads 306 may be arranged more flexibly on the inflatable seat 20, allowing the plurality of massage spray heads 306 to be arranged in a regular or irregular manner, and thus meeting different massage desires.

In the illustrated example embodiment, the water supply pipeline 308 comprises two secondary water supply pipes 318. The six massage spray heads 306 of the massage spray head group of each inflatable seat 20 are connected to and in fluid communication with the intermediate water supply pipeline 316 by means of one corresponding secondary water supply pipe 318 arranged behind the backrest portion 214 of the inflatable seat 20. In the illustrated example embodiment, the six massage spray heads 306 of each massage spray head group are uniformly distributed on two sides of the corresponding secondary water supply pipe 318. Optionally, the secondary water supply pipe 318 may be bent so that at least a part of the secondary water supply pipe 318 follows the contour of the backrest portion 214 of the inflatable seat 20, such that the arrangement of the water supply pipelines is more compact.

It can be understood that the numbers and distributions of inflatable seats and massage spray heads in the water containing cavity of the inflatable massage pool and the configuration of the corresponding water supply pipelines are merely examples, any may be modified according to actual conditions. For example, one or more than two inflatable seats may be disposed in the water containing cavity; each inflatable seat may have fewer than six or more than six massage spray heads; each inflatable seat may have the same or different number of massage spray heads arranged thereon; and the massage spray heads on each inflatable seat may be distributed regularly or irregularly. The configurations of the water supply pipelines of the inflatable massage pool may be determined according to the numbers and positions of the corresponding inflatable seat and massage spray heads. For example, in a situation in which the inflatable massage pool is provided with only one inflatable seat, the water supply pipeline may comprise only one secondary water supply pipe, and the intermediate water supply pipeline may comprise only one communication pipe which may be connected to and in fluid communication with the water intake device and the secondary water supply pipe respectively by means of two two-way joints. In a situation in which the inflatable massage pool is provided with more than two inflatable seats, the water supply pipeline may comprise more than two secondary water supply pipes, and the intermediate water supply pipeline may comprise more than two communication pipes which may be in fluid communication with the water intake device and the secondary water supply pipes respectively by means of a plurality of tube joints.

Referring to FIGS. 7, 10 and 11, the fluid supply pipeline 305 further comprises a first air supply pipeline 324. At least a part of the first air supply pipeline 324 extends into the water containing cavity 116 from the inflatable side wall 114 and is connected to the plurality of massage spray heads 306 in the water containing cavity 116. The first air supply pipeline 324 is in fluid communication with the plurality of massage spray heads 306 to supply air to the plurality of massage spray heads 306. The massage spray heads 306 can mix the water flow entering the massage spray heads 306 with an air flow to form bubbled water bringing a soft tactile sense, thereby contributing to the massage experience for the user.

The first air supply pipeline 324 comprises a primary air supply pipe 326 and at least one secondary air supply pipe 328. The primary air supply pipe 326 is disposed substantially within the first air chamber 112 of the inflatable side wall 114 and is in fluid communication with an external space of the inflatable massage pool 1. The at least one secondary air supply pipe 328 is disposed substantially within the water containing cavity 116 and is in fluid communication with the primary air supply pipe 326. Each secondary air supply pipe 328 is configured to supply an air flow from the primary air supply pipe 326 to at least one of the plurality of massage spray heads 306.

In the illustrated example embodiment, the first air supply pipeline 324 comprises one air intake member 332, two primary air supply pipes 326, two tube connectors 364, and twelve secondary air supply pipes 328. The air intake member 332 is arranged on the external wall 102 of the inflatable side wall 114, and the air intake member 332 is hermetically fixed (e.g., welded) to the external wall 102 of the inflatable side wall 114 by means of a fixing flange 333 thereon. An air intake end of each primary air supply pipe 326 is in fluid communication with the external space of the inflatable massage pool 1 by means of the air intake member 332. An air discharge end of each primary air supply pipe 326 is connected to and in fluid communication with air intake ends of six secondary air supply pipes 328 located behind the backrest portion 214 of the corresponding inflatable seat 20 by means of one respective tube connector 364. Each tube connector 364 is hermetically fixed (e.g., welded) to the internal wall 104 of the inflatable side wall 114 by means of a fixing flange 365 thereon. Each massage spray head 306 further comprises an air intake portion 334 (see FIG. 11) located in the water containing cavity 116. An air discharge end of each secondary air supply pipe 328 is connected to and in fluid communication with the air intake portion 334 of one corresponding massage spray head 306 to supply the air flow from the primary air supply pipe 326 to the corresponding massage spray head 306. It can be understood that in other example embodiments, each secondary air supply pipe may alternately be connected to and in fluid communication with another appropriate number of massage spray heads as desired.

In the illustrated example embodiment, the first air supply pipeline 324 comprises two primary air supply pipes 326. It can be understood that in some other example embodiments, the first air supply pipeline may alternately comprise one or more than two primary air supply pipes. In the illustrated example embodiment, two inflatable seats 20 are arranged in the water containing cavity 116, and correspondingly, the first air supply pipe 324 comprises two primary air supply pipes 326. It can be understood that, in some other example embodiments in which more than two inflatable seats are disposed in the water containing cavity, the air supply pipes may include a corresponding number of primary air supply pipes, and each primary air supply pipe may be configured to supply the air flow from the outside of the inflatable massage pool to the secondary air supply pipe located behind the respective inflatable seat. It should also be understood that the configuration of the first air supply pipeline is merely an example, and may be modified according to actual conditions.

Referring to FIGS. 6 and 10, the fluid supply pipeline 305 further comprises a second air supply pipeline 336. The pumping unit 304 comprises an air pump in fluid communication with the second air supply pipeline 336. The inflatable massage pool 1 comprises a wave-making unit 216 in fluid communication with the second air supply pipeline 336. The wave-making unit 216 has a plurality of wave-making holes 218 in fluid communication with the water containing cavity 116. In the illustrated example embodiment, the wave-making unit 216 is arranged on the top sheet 202 at the seat portion 212 of the first inflatable seat **20*a* to massage the user's legs. The second air supply pipeline 336 comprises a primary air intake pipe 338 and a secondary air intake pipe, the primary air intake pipe 338 is disposed substantially within the inflatable side wall 114 and is connected to and in fluid communication with the air pump of the pumping unit 304. Similar to the fixing method of the massage water outlet pipe 310, the primary air intake pipe 338 may extend through a fourth sleeve of the inflatable side wall 114 that is configured to receive the primary air intake pipe 338, and a fixing flange 339 on the primary air intake pipe 338 may be hermetically fixed (e.g., welded) to the internal wall 104 of the inflatable side wall 114. The wave-making unit 216 may be in fluid communication with the primary air intake pipe 338 by means of the secondary air intake pipe. In this way, the air from the air pump of the pumping unit 304 may be supplied to the wave-making unit 216 through the second air supply pipeline 336, and further enter the water in the water containing cavity 116 through the wave-making holes 218 of the wave-making unit 216** to form air bubbles for massage, contributing to the massage experience for the user.

It can be understood that in some other example embodiments, the wave-making unit may alternately be arranged on the pool body or on another position of the inflatable seat. For example, the wave-making unit may be arranged on the bottom wall of the pool body around the inflatable seat.

It should be understood that the terms "pipeline" and "pipe" as used herein are intended to be interpreted broadly and should be understood to be components and/assemblies capable of delivering a fluid. In other words, "pipeline" and "pipe" may each be a single pipe, or an assembly formed by assembling a plurality of pipes.

It should also be understood that the components and features described herein can be made of a variety of materials including, but not limited to, polymer, rubber, metal, and other suitable materials well known to those skilled in the art or a combination thereof. The example embodiments shown in FIGS. 1 to 11 merely illustrate example shapes, sizes and arrangements of various optional components of the inflatable massage pool with a built-in inflatable seat according to one or more example embodiments, which are merely illustrative rather than restrictive, and that other shapes, sizes and arrangements may be employed. Those skilled in the art can easily make modifications, variations, and equivalents of these described example embodiments on the basis of the disclosed content. For example, any feature illustrated or described as part of an example embodiment can be used with another example embodiment to provide a further example embodiment.

It may be understood that the example embodiments described herein may be considered in a descriptive sense only and not for purposes of limitation. Descriptions of features or aspects within each example embodiment may be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. An inflatable massage pool comprising:

a pool body, comprising:

an inflatable side wall defining therein a first air chamber, and a bottom wall, wherein the inflatable side wall and the bottom wall jointly define a water containing cavity;

an inflatable seat disposed in the water containing cavity, the inflatable seat defining therein a second air chamber; and a fluid delivery assembly, comprising:

a fluid supply pipeline disposed at least partially within one of the water containing cavity and the second air chamber, and a plurality of massage spray heads mounted to the inflatable seat and configured to spray fluid into the water containing cavity, wherein the fluid supply pipeline is in fluid communication with the plurality of massage spray heads.

2. The inflatable massage pool according to claim 1, wherein:

the fluid supply pipeline comprises a water supply pipeline disposed at least partially within the one of the water containing cavity and the second air chamber and in fluid communication with the plurality of massage spray heads; and the fluid delivery assembly further comprises:

a water outlet pipeline in fluid communication with the water containing cavity, and a pumping unit connected to the water outlet pipeline and to the water supply pipeline thereby providing fluid communication between the water outlet pipeline and the water supply pipeline.

3. The inflatable massage pool according to claim 2, the fluid supply pipeline further comprising an air supply pipeline disposed at least partially within the one of the water containing cavity and the second air chamber;

wherein the air supply pipeline is in fluid communication with the plurality of massage spray heads.

4. The inflatable massage pool according to claim 3, wherein an air intake end of the air supply pipeline is in fluid communication with a space external to the inflatable massage pool.

5. The inflatable massage pool according to claim 3, the massage spray head comprising:

a water intake portion connected to and in fluid communication with the water supply pipeline, and an air intake portion connected to and in fluid communication with the air supply pipeline;

wherein each of the water intake portion and the air intake portion is disposed within the one of the water containing cavity and the second air chamber.

6. The inflatable massage pool according to claim 2, wherein:

the plurality of massage spray heads are each at least partially disposed within the second air chamber;

the water supply pipeline extends at least partially into the second air chamber from the inflatable side wall; and the water supply pipeline is connected to and in fluid communication with each of the plurality of massage spray heads.

7. The inflatable massage pool according to claim 6, the water supply pipeline comprising:

a primary water supply pipe disposed at least partially within the inflatable side wall and connected to and in fluid communication with the pumping unit, and a secondary water supply pipe disposed at least partially within the second air chamber and in fluid communication with the primary water supply pipe.

8. The inflatable massage pool according to claim 7, the water supply pipeline further comprising an intermediate water supply pipeline, and wherein the secondary water supply pipe is connected to and in fluid communication with the primary water supply pipe via the intermediate water supply pipeline.

9. The inflatable massage pool according to claim 7, the water supply pipeline comprising:

a plurality of secondary water supply pipes disposed within the second air chamber and arranged parallel to each other, wherein each of the plurality of secondary water supply pipes is connected to and in fluid communication with at least two massage spray heads, arranged in a length direction of the secondary water supply pipe, from among the plurality of massage spray heads.

10. The inflatable massage pool according to claim 6, the fluid supply pipeline further comprising:

an air supply pipeline extending at least partially into the second air chamber from the inflatable side wall and connected to and in fluid communication with the plurality of massage spray heads.

11. The inflatable massage pool according to claim 10, the air supply pipeline comprising:

a primary air supply pipe disposed at least partially within the first air chamber and in fluid communication with a space external to the inflatable massage pool; and a secondary air supply pipe disposed at least partially within the second air chamber and in fluid communication with the primary air supply pipe.

12. The inflatable massage pool according to claim 11, the air supply pipeline further comprising an intermediate air supply pipeline;

wherein the secondary air supply pipe is connected to and in fluid communication with the primary air supply pipe via the intermediate air supply pipeline.

13. The inflatable massage pool according to claim 2, wherein:

each of the plurality of massage spray heads is disposed at least partially within the inflatable seat; and the water supply pipeline extends at least partially into the water containing cavity from the inflatable side wall and is connected to and in fluid communication with each of the plurality of massage spray heads.

14. The inflatable massage pool according to claim 13, the inflatable seat further comprising:

a plurality of massage spray head receiving portions, each defining therein a receiving space which is not in fluid communication with the second air chamber and which is sized to receive a corresponding one of the plurality of massage spray heads therein.

15. The inflatable massage pool according to claim 13, the water supply pipeline comprising:

a primary water supply pipe disposed at least partially within the inflatable side wall and connected to and in fluid communication with the pumping unit; and a secondary water supply pipe disposed at least partially within the water containing cavity and in fluid communication with the primary water supply pipe.

16. The inflatable massage pool according to claim 15, wherein:

the inflatable seat comprises a plurality of inflatable seats;

the water supply pipeline comprises a plurality of secondary water supply pipes corresponding in number to a number of the plurality of inflatable seats;

the plurality of massage spray heads comprising a plurality of massage spray head groups corresponding in number to the number of the plurality of inflatable seats;

each of the plurality of massage spray head groups is connected to and in fluid communication with a corresponding one of the plurality of secondary water supply pipes; and each of the plurality of massage spray head groups is mounted to a corresponding one of the plurality of inflatable seats.

17. The inflatable massage pool according to claim 15, the water supply pipeline further comprising an intermediate water supply pipeline, wherein the secondary water supply pipe is connected to and in fluid communication with the primary water supply pipe via the intermediate water supply pipeline.

18. The inflatable massage pool according to claim 13, the fluid supply pipeline further comprising an air supply pipeline extending at least partially into the water containing cavity from the inflatable side wall and connected to and in fluid communication with the plurality of massage spray heads.

19. The inflatable massage pool according to claim 18, the air supply pipeline comprising:

a primary air supply pipe disposed at least partially within the first air chamber and in fluid communication with a space external to the inflatable massage pool; and a secondary air supply pipe disposed at least partially within the water containing cavity and in fluid communication with the primary air supply pipe.

20. The inflatable massage pool according to one of claims 1 to 19, the inflatable seat comprising:

a top sheet, a bottom sheet, and a side enclosure sheet, connected to one another and thereby jointly defining the second air chamber, wherein the plurality of massage spray heads are fixed to the top sheet.

* * * * *